Aug. 27, 1957     T. W. HARPER     2,803,846
WINDSCREEN WIPER SYSTEM
Filed July 6, 1955     2 Sheets-Sheet 2
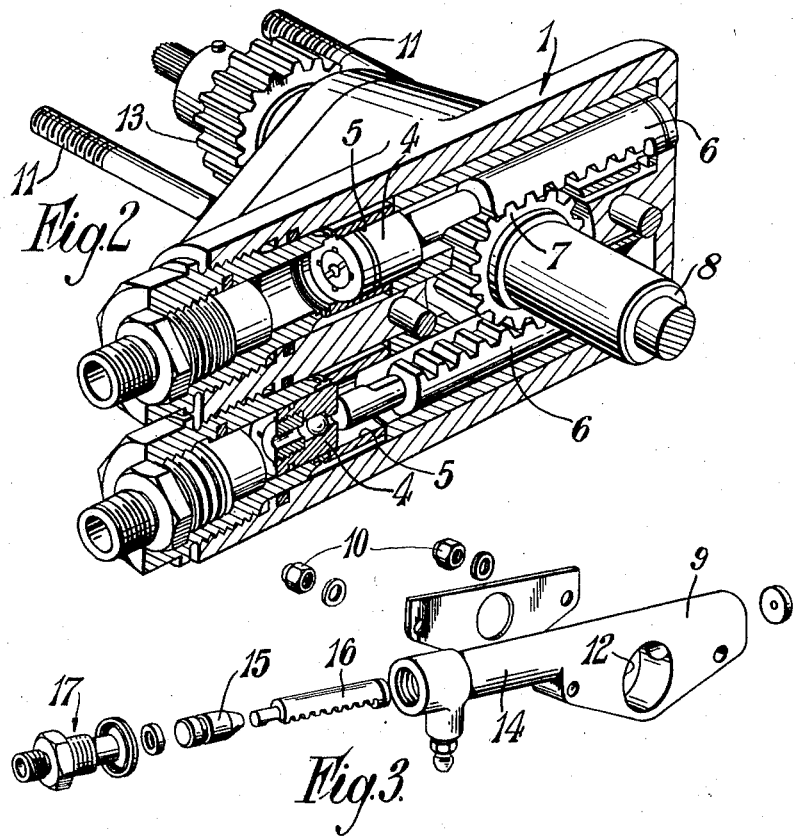
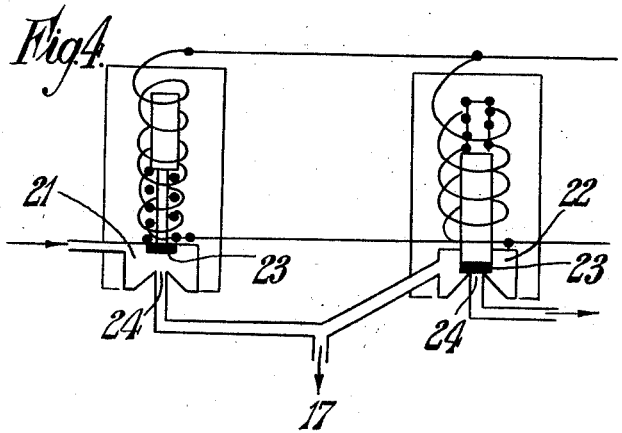
INVENTOR
Thomas William Harper
by Benj. T. Slauber
his attorney United States Patent Office 2,803,846
Patented Aug. 27, 1957

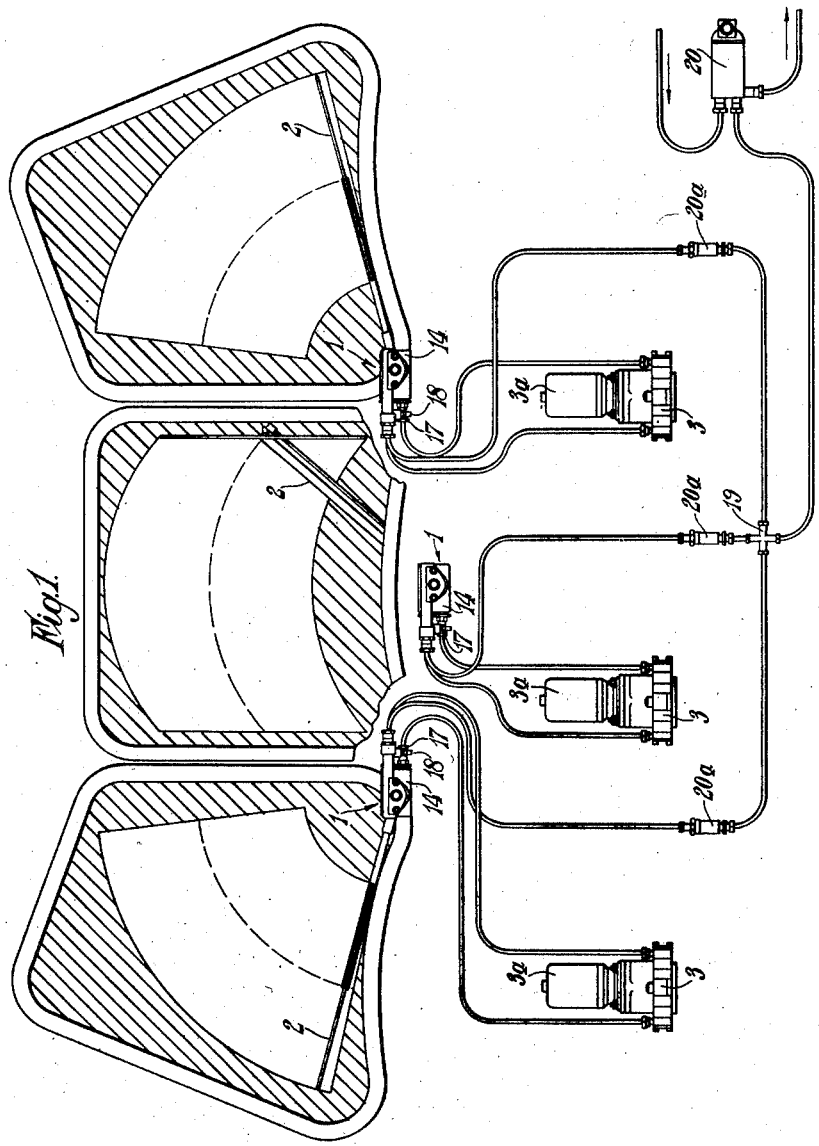

2,803,846

WINDSCREEN WIPER SYSTEM

Thomas William Harper, Keresley, Coventry, England, assignor to Dunlop Rubber Company Limited, London, England, a British company Application July 6, 1955, Serial No. 520,280

Claims priority, application Great Britain July 15, 1954

7 Claims. (Cl. 15—253)

My invention relates to windscreen wiper systems, and more particularly to hydraulic windscreen wiper systems for aircraft.

Aircraft are normally provided with two or more windscreen wiper blades which may be reciprocated across the windscreen or windscreen panels by a wiper head hydraulically operated by a pump unit. When the wiper blades are not in use it is desirable that they should automatically "park" themselves to one side or other of the windscreen so as to obstruct vision through the screen as little as possible. My present invention provides a hydraulically-operated windscreen wiper system wherein means are provided for automatically "parking" the wiper blades in an inoperative position at one edge of the windscreen or windscreen panel.

According to my invention a windscreen wiper system comprises a reciprocable shaft having a wiper blade associated therewith, fluid pressure actuated electrically-controlled means to reciprocate said shaft, a mechanism associated with said shaft for rotating said shaft to a predetermined angular position and means actuated when said electrically controlled means are de-energized to operate said mechanism and move the wiper blade to said predetermined angular position.

According to the invention also a wind-screen wiper comprises a reciprocable shaft, a windscreen wiper blade associated therewith, fluid pressure operated means to reciprocate said shaft and a mechanism, actuated by fluid pressure and associated with said shaft, to move the wiper blade to a "parked" position when said blade is not in use.

Preferably the fluid-pressure-actuated electrically-controlled means for reciprocating the wiper blade comprises an electrically-operated two-throw pump which actuates a pair of hydraulic piston and cylinder mechanisms in turn to operate a rack and pinion mechanism and so reciprocate the wiper shaft.

Preferably the mechanism for rotating the shaft to a predetermined angular position comprises a rack which is in mesh with a pinion secured to the wiper shaft and which is movable to rotate said pinion.

The rack may be moved by a solenoid or by pneumatic pressure, but preferably a plunger secured to the rack is moved in a cylinder by the application of hydraulic pressure thereto. Preferably also the means actuated when said electrically controlled means are de-energized comprises a solenoid-operated control valve mechanism in circuit with the electrically-operated pump and arranged to connect the cylinder with the hydraulic pressure source only on switching off the wiper motor. The pressure from the source thereupon moves the plunger to move the rack, rotate the pinion and move the wiper blade to a predetermined or "parked" position.

The invention will now be described with reference to the accompanying drawings of which:

Figure 1 is a diagrammatic representation of a windscreen wiper system constructed according to one embodiment of the invention.

Figure 2 is a perspective part-sectional view of a windscreen wiper head incorporated in the system of Figure 1.

Figure 3 is a perspective view of the various components of a supplementary mechanism for attachment to the wiper head of Figure 2, and Figure 4 is a diagrammatic representation of a solenoid operated control valve mechanism which is incorporated in the system of Figure 1.

In one embodiment of the present invention (Figure 1) a hydraulic wiper system for an aircraft having a windscreen made up of three panels comprises a wiper head 1 secured adjacent each panel, a wiper blade 2 associated with each wiper head 1 and reciprocated thereby to wipe a substantial area of each panel and an electrically-operated two-throw pump unit 3 to operate each wiper head 1.

The wiper head 1 comprises a pair of pistons 4 (Figure 2) each reciprocable in a cylinder 5 under the action of the two-throw pump 3 and a rack 6 associated with each piston 4 which oscillates a pinion 7 secured to a shaft 8 on which the wiper blade 2 is mounted. This arrangement is fully described in my British patent specification No. 639,877.

In the present system a housing 9 (Figure 3) is secured by nut 10 and bolt 11 assemblies to the side of the wiper head 1 remote from the wiper blade 2, said housing 9 being provided with an aperture 12 through which one end of the shaft 8 extends. A pinion 13, secured to said end of the shaft 8, is located within said aperture 12. The housing 9 is provided at one end, with a tubular extension 14, and a passage (not shown) extending through the housing 9 is aligned with said tubular extension 14.

Fluid tightly slidable within said tubular extension 14 is a plunger 15 one end of which is adapted to contact a rack 16 which is reciprocable within the passage in the housing 9 and which is in mesh with said pinion 13. The end of the tubular extension 14 remote from the housing 9 is provided with a connection 17 for hydraulic fluid and a bleed-screw 18 (Figure 1) is fitted to allow air bubbles and the like to be bled from the system.

The three hydraulic fluid connections 17, one to each wiper head 1, are connected together by a four-way connection 19 (Figure 1), which in turn is connected to the output side of a solenoid-operated control valve mechanism to be later described which has its input side connected to a hydraulic pump (not shown). A pressure relay 20a of the type described in British specification No. 701,973 is inserted in the hydraulic line leading from each tubular extension to the four-way connection 19.

The solenoid-operated control valve mechanism 20 comprises a housing containing two chambers 21, 22 (Figure 4) in each of which a solenoid-operated spring-loaded valve closure member 23 is located to co-operate with a valve seat 24 to form a valve. One chamber 21 is connected to the hydraulic pump and, through the valve seat 24 with the other chamber 22 and also, through the four-way connection 19, with the hydraulic fluid connection 17 of the three wiper heads 1. The valve member 23 in chamber 21 is spring-loaded to the open position and energizing of the solenoid closes the valve. The other chamber 22 is connected through the associated valve seat 24 with a liquid reservoir and the valve in this chamber is spring loaded to the closed position and energizing of the solenoid opens the valve.

The two-throw pumps 3 associated with each of the wiper heads 1 are each driven by an electric motor associated therewith. The electric motors 3a are connected electrically in circuit with the solenoid-operated control valve mechanism 20, the arrangement being such that on the pilot throwing a switch the three electric motors 3a will be energized to operate the wipers and at the same time the solenoid-operated control valve mechanism 20 is energized to close the valve in the chamber 21 and open the valve in the other chamber 22 thus cutting off the hydraulic pressure from the source and connecting the three tubular extensions 14 with said other chamber 22 and hence with the liquid reservoir.

The windscreen wipers operate in the manner described in the British patent specification No. 639,877, i. e. the two-throw pumps 3 reciprocate the pistons 4 in each wiper head 1, the pistons 4 moving the racks 6 to oscillate the wiper shaft 8 and hence operate the wiper blade 2.

On the pilot requiring to stop the operation of the wiper blades he operates the switch to break the circuit and de-energize the electric motors 3a. The solenoid-operated control valve mechanism 20 is also de-energized, the valve springs moving the two valves, one to open position and the other to closed position, the connection to the reservoir being closed by one valve and the connection to the hydraulic pump being opened by the other valve. Liquid under pressure from the source thus flows through the control valve mechanism 20 and to the tubular extensions 14. Here it acts on the plungers 15 to move them rearwardly, each plunger 15 in turn moving the rack 16 associated therewith to an extreme permitted position. The rack meshes with the wiper pinion 13 and hence movement of the rack 16 to this position rotates the shaft 8 and moves the wiper blade 2 to a "parked" position at one side of the windscreen panel.

On energizing the circuit to commence wiping once more the solenoid-operated valves 20 are energized to cut off the hydraulic pressure from the source and at the same time to allow the hydraulic liquid in the said tubular extension to flow to the reservoir.

Having now described my invention, what I claim is:

1. A windscreen wiper system comprising a wiper blade, an oscillatable shaft operatively associated therewith to actuate the blade, a fluid-pressure operated actuating device operatively associated with mechanism to oscillate said shaft between predetermined limits of oscillation in each direction, a second fluid-pressure operated actuating device operatively associated with further mechanism to rotate said shaft through a predetermined annual movement in one direction independently of said first-named fluid-pressure operated device, pressure-fluid conduits communicating with said devices from a source of fluid pressure, and electrically controlled valve means operatively associated with said conduits operable selectively to actuate said first-named or said second-named fluid-pressure operated actuating device.

2. A windscreen wiper system according to claim 1 wherein said mechanisms each comprise a rack associated with a pinion secured to said shaft.

3. A windscreen wiper system according to claim 2 wherein the pinion with which is associated the rack operatively of said first-named mechanism is separate from the pinion with which is associated the rack of said second-named mechanism.

4. A windscreen wiper system according to claim 3 wherein each said fluid-pressure operated actuating device comprises a plunger fluid-tightly slidable in a cylinder and connected to one of said racks and movable upon admission of pressure-fluid to said cylinder.

5. A windscreen wiper system according to claim 1 wherein each said fluid-pressure operated actuating device comprises a plunger fluid-tightly slidable in a cylinder and each said mechanism comprises a rack engageable with a pinion secured on said shaft, each said cylinder being in pressure-fluid communication with said source of pressure-fluid, and said electrically-controlled valve means is interposed in pressure-fluid conduits connecting said cylinders with said pressure-fluid source, between said source and each said device, said valve means being normally spring-biased to place said second-named device in pressure-fluid communication with said pressure-fluid source and being operable upon energization of electric control means operatively associated therewith to close the pressure fluid communication between said source and said second-named device and to establish pressure-fluid communication between said source and said first-named fluid-pressure operated actuating device.

6. A windscreen wiper system according to claim 5 wherein said electrically-controlled valve means comprise a solenoid-operated valve in the pressure fluid conduit associated with said first-named device and a second solenoid-operated valve associated with said second-named device, a helical compression spring associated with the first-named said valve and normally urging said valve to closed position, a second helical compression spring associated with the second-named said valve and normally urging said second-named valve to open position, and means for applying or interrupting the flow of electricity through the solenoids of said solenoid-operated valves whereby upon applying the flow of electricity through said solenoids said valve associated with said first-named device is opened and the valve associated with said second-named device is simultaneously closed.

7. A windscreen wiper system according to claim 5 wherein said electrically-controlled valve means comprise a housing containing two pressure chambers, one of said chambers being connected with a source of pressure fluid, a pressure-fluid conduit connecting the other said chamber with atmosphere or with a fluid reservoir, a pressure-fluid conduit connecting said one of said chambers with the other said chamber and with said cylinder of said second-named fluid-pressure operated device, a valve closure member in said one chamber, a spring associated with said valve closure member and normally biasing said member away from an associated valve seat to permit the flow of pressure fluid from said source to the cylinder of said second-named fluid-pressure operated device and to said other chamber, a valve closure member in said other chamber, a spring associated with the second-named said valve closure member and normally urging said second-named valve closure member into seating engagement with an associated valve seat to prevent the flow of pressure fluid to atmosphere or to said fluid reservoir, a solenoid operatively associated with each said valve closure member, an electric circuit connecting each said solenoid with a source of potential and with means to close said electric circuit whereby, on closing said electric circuit, said valve closure members are moved by said solenoids against their springs to prevent the flow of pressure-fluid from said one chamber to the cylinder of said second-named device and to connect the cylinder of said first-named device to atmosphere or to said fluid reservoir.

References Cited in the file of this patent

UNITED STATES PATENTS

| 2,372,813 | Darling | Apr. 3, 1945 |
| 2,547,175 | Sacchini | Apr. 3, 1951 |